US 6,582,103 B1

(12) United States Patent
Popovich et al.

(10) Patent No.: US 6,582,103 B1
(45) Date of Patent: Jun. 24, 2003

(54) LIGHTING APPARATUS

(75) Inventors: John Popovich, Del Mar, CA (US); David G. Pelka, Los Angeles, CA (US); William A. Parkyn, Lomita, CA (US); Michael J. Popovich, Del Mar, CA (US); Eric D. Pelka, Los Angeles, CA (US)

(73) Assignee: Teledyne Lighting and Display Products, Inc., Hawthorne, CA (US)

( * ) Notice: Subject to any disclaimer, the term of this patent is extended or adjusted under 35 U.S.C. 154(b) by 0 days.

(21) Appl. No.: 09/620,051

(22) Filed: Jul. 20, 2000

Related U.S. Application Data

(63) Continuation-in-part of application No. 08/936,717, filed on Sep. 24, 1997, which is a continuation-in-part of application No. 08/764,298, filed on Dec. 12, 1996, now abandoned.
(60) Provisional application No. 60/144,920, filed on Jul. 21, 1999.

(51) Int. Cl.[7] .................................................. F21V 7/00
(52) U.S. Cl. ..................... 362/307; 361/31; 361/224; 361/240; 361/245
(58) Field of Search ..................... 362/31, 27, 29, 362/555, 224, 249, 240, 238, 307, 244, 245

(56) References Cited

U.S. PATENT DOCUMENTS

| 3,821,590 | A | 6/1974 | Kosman et al. ............. 313/499 |
| 4,045,665 | A | 8/1977 | Williams et al. ....... 240/51.1 R |
| 4,107,767 | A | 8/1978 | Anquetin ..................... 362/249 |
| 4,267,489 | A | 5/1981 | Morohashi .................. 315/324 |
| 4,271,458 | A | 6/1981 | George, Jr. ................. 362/236 |
| 4,335,421 | A | 6/1982 | Modia et al. ............... 362/223 |
| 4,376,966 | A | 3/1983 | Tieszen ...................... 362/249 |
| 4,418,378 | A | 11/1983 | Johnson ...................... 362/97 |
| 4,471,412 | A | 9/1984 | Mori ........................... 362/32 |
| 4,544,996 | A | 10/1985 | George ....................... 362/238 |
| 4,628,421 | A | 12/1986 | Saar ........................... 362/238 |
| 4,665,470 | A | 5/1987 | George, Jr. ................. 362/236 |
| 4,791,540 | A | 12/1988 | Dreyer, Jr. et al. ......... 362/331 |
| 4,835,661 | A | 5/1989 | Fogelberg et al. ............ 362/97 |
| 4,884,178 | A | 11/1989 | Roberts ...................... 362/241 |
| 4,908,743 | A | 3/1990 | Miller ........................ 362/238 |
| 4,954,931 | A | 9/1990 | Hassler, Jr. .................. 362/32 |
| D311,588 | S | 10/1990 | Nagano ....................... D26/24 |
| 4,989,122 | A | 1/1991 | Allekotte et al. ............. 362/97 |
| 4,994,944 | A | 2/1991 | Vernondier ................. 362/238 |
| 4,999,755 | A | 3/1991 | Lin ............................ 362/250 |

(List continued on next page.)

FOREIGN PATENT DOCUMENTS

| DE | 42 37 107 A1 | 5/1994 |
| EP | 0 732 679 A1 | 9/1996 |
| EP | 0 733 850 A2 | 3/1998 |
| WO | WO 98/26212 | 6/1998 |
| WO | WO 99/06759 | 7/1998 |

Primary Examiner—Sandra O'Shea
Assistant Examiner—Guiyoung Lee
(74) Attorney, Agent, or Firm—Kirkpatrick & Lockhart LLP

(57) ABSTRACT

An illumination apparatus provides an output with high spatial uniformity of luminance. The illumination apparatus includes a cavity that has reflective surfaces and an output area. At least one light source is disposed in the cavity, with the light source including a point source (such as an LED) and an optical diverter having a flared (e.g., cuspated) reflecting surface. Light from the point source is distributed by the optical diverter towards the reflective surfaces within the cavity. Before exiting the device, light passes through an optical conditioning element that is positioned over the output area of the cavity. The optical conditioning element includes at least a diffuser, such as a translucent film or plastic sheet, and preferably also includes one or more prism sheets such as a brightness-enhancing film.

52 Claims, 15 Drawing Sheets

U.S. PATENT DOCUMENTS

| | | | |
|---|---|---|---|
| 5,020,252 A | 6/1991 | De Boef | 40/564 |
| 5,027,262 A | 6/1991 | Freed | 362/249 |
| 5,034,864 A | 7/1991 | Oe et al. | 362/224 |
| 5,034,866 A | 7/1991 | Pujol | 362/240 |
| 5,122,940 A | 6/1992 | Wiegand | 362/249 |
| 5,143,433 A | 9/1992 | Farrell | 362/29 |
| 5,186,537 A | 2/1993 | Katoh et al. | 362/347 |
| 5,195,818 A | 3/1993 | Simmons et al. | 362/224 |
| 5,207,495 A | 5/1993 | Ahlstone | 362/33 |
| 5,222,799 A | 6/1993 | Sears et al. | 362/146 |
| 5,224,770 A | 7/1993 | Simmons et al. | 362/29 |
| 5,272,601 A | 12/1993 | McKillip | 362/27 |
| 5,309,335 A | 5/1994 | Tryon | 362/152 |
| 5,337,225 A | 8/1994 | Brookman | 362/145 |
| 5,373,428 A | 12/1994 | Day | 362/223 |
| 5,381,309 A | 1/1995 | Borchardt | 362/31 |
| 5,386,357 A | 1/1995 | Tryon et al. | 362/362 |
| 5,430,627 A | 7/1995 | Nagano | 362/249 |
| 5,438,495 A | 8/1995 | Ahlen et al. | 362/249 |
| 5,493,481 A | 2/1996 | Wiegand | 362/249 |
| 5,504,545 A | 4/1996 | Hagihara et al. | 353/74 |
| 5,523,930 A | 6/1996 | Fritts | 362/223 |
| 5,537,302 A | 7/1996 | Hillstrom et al. | 362/246 |
| 5,570,525 A | 11/1996 | Paglieri et al. | 40/564 |
| 5,575,459 A | 11/1996 | Anderson | 362/240 |
| 5,669,700 A | 9/1997 | Wendel | 362/223 |
| 5,685,633 A | 11/1997 | Engel | 362/223 |
| 5,688,042 A | 11/1997 | Madadi et al. | 362/240 |
| 5,726,706 A | 3/1998 | Walsh | 348/151 |
| 5,746,503 A | 5/1998 | Hillstrom et al. | 362/248 |
| 5,826,973 A | 10/1998 | Melzian et al. | 362/297 |
| 5,848,837 A | 12/1998 | Gustafson | 362/235 |
| 5,883,684 A | 3/1999 | Millikan et al. | 349/65 |
| 5,897,201 A * | 4/1999 | Simon | 362/147 |
| 5,915,830 A | 6/1999 | Dickson et al. | 362/249 |
| 5,918,962 A | 7/1999 | Nagano | 362/146 |
| 5,934,792 A | 8/1999 | Camarota | 362/249 |
| 6,007,225 A | 12/1999 | Ramer et al. | 362/554 |

* cited by examiner

LIGHTING APPARATUS

BACKGROUND OF THE INVENTION

This application claims the benefit of U.S. Provisional Application No. 60/144,920, filed Jul. 21, 1999 and is a continuation in part of application Ser. No. 08/936,717 filed Sep. 24, 1997, which in turn is a continuation in part of Application No. 08/764,298 filed Dec. 12, 1996, now abandoned all of which are incorporated herein by reference.

FIELD OF THE INVENTION

The present invention relates generally to the field of lighting devices, and more specifically to devices capable of a low profile which utilize point sources, such as light emitting diodes, for illumination.

DESCRIPTION OF THE RELATED ART

Low profile lighting devices are useful in a variety of applications, such as decorative strip lighting or display panel illumination. One common form of strip lighting utilizes neon tubes. Neon tubes have the advantages of being lightweight and lending themselves to decorative lighting. Further, the light output from neon tubes is relatively diffuse and uniform in appearance. However, neon tubes are fragile, require high voltage, and generate significant radio-frequency (RF) interference, which must often be shielded at significant cost. Fluorescent lighting is likewise diffuse, but is generally limited to short lengths and typically includes unattractive electrical connections.

Display panel illumination is often accomplished by placing light sources behind the panel to illuminate it. A diffuser box containing a light source can generate output that is fairly uniform, so long as the light sources are sufficiently far away from the display panel. This makes such devices bulky, however. If the light sources are too close to the panel, the illumination will no longer be uniform, and the sources will be seen as "hot spots." Thus there is a need for a compact lighting device that provides uniform output intensity.

SUMMARY OF THE INVENTION

According to one aspect of the invention, an illumination apparatus includes a cavity having reflective surfaces and an output area, as well as at least one light source disposed in the cavity, wherein the light source includes a point source and an optical diverter having a flared reflecting surface. The apparatus further includes an optical conditioning element over the output area, with the optical conditioning element including at least a diffuser, for example, a translucent film or plastic sheet. In a preferred embodiment, the flared surface is curved, and may be cuspated. In one preferred embodiment, the point source comprises an LED. In a preferred embodiment, the cavity reflecting surfaces are diffusively reflective.

According to another aspect of the invention, an illumination apparatus comprises a housing that includes a cavity having reflective surfaces and an output aperture. The apparatus also includes an optical conditioning element across the output aperture, in which the conditioning element comprises at least one sheet having a plurality of pixels. The apparatus further includes at least one light source disposed within the cavity directly beneath the conditioning element, in which the (at least one) light source includes a point source spaced less than 3-½ inches from the sheet that illuminates the reflective surfaces such that the ratio of the luminance of adjacent pixels is between 0.95 and 1.05 and such that the ratio of the luminance of non-adjacent pixels is between 0.5 and 2.0, whereby the appearance of illumination at the sheet is substantially uniform. In a preferred embodiment, the optical conditioning element includes a diffuser sheet disposed below the prism sheet. In one preferred embodiment, the optical conditioning element includes a second prism sheet with orientation 90° from the first. In a preferred embodiment, the (at least one) light source includes a point source and a total internal reflection lens having a cuspated surface for reflecting light from the point source against the diffusive reflective surfaces.

According to another aspect of the invention, an illumination apparatus includes a cavity formed by reflective material, in which the cavity has an output area. An optical conditioning element is at the output area. The apparatus further includes a light source in the cavity, in which the light source includes a point source and an optical diverter having a reflecting surface which is partially reflective and partially transmissive. The reflective surface of the diverter allows a portion of light incident thereon to pass through the reflecting surface, while reflecting another portion of the incident light onto the reflective material of the cavity. The reflective material reflects light within the cavity, whereby the output area and the optical conditioning element are illuminated. In a preferred embodiment, the reflecting surface of the diverter is comprised of scattering centers which scatter light incident thereon.

According to yet another aspect of the invention, an illumination apparatus includes an optical diverter. The diverter includes transparent material having a reflecting surface formed by a refractive index interface configured to totally internally reflect light from a point source positioned to emit a first portion of light rays towards the reflecting surface and a second portion of light rays towards a side surface of the diverter. The diverter includes a refracting interface that refracts the second portion of light rays towards the reflecting surface, such that both the first and second portions of light rays are reflected from the reflecting surface.

According to yet another aspect of the invention, there is provided an optical diverter that includes transparent material having a flared reflecting surface formed by a refractive index interface. The interface is configured to totally internally reflect light from a point source which is positioned adjacent to an apex of the flared reflecting surface and which emits light rays for reflection by the reflecting surface.

According to a further aspect of the invention, an illumination apparatus includes a cavity having reflective surfaces and an output area. The apparatus further includes at least one light source disposed in the cavity, in which the light source includes a point source and an optical diverter having a surface that is partially reflective and partially transmissive. The apparatus also includes an optical conditioning element over the output area, in which the optical conditioning element includes a diffuser, wherein the diverter is positioned between the point source and optical conditioning element such that (a) a portion of light emitted by the point source is reflected from the diverter towards the reflective surfaces of the cavity, and (b) another portion of light emitted by the point source is transmitted through the surface of the diverter towards the optical conditioning element, with the diverter sized to allow at least a substantial portion of the reflected light to reach the optical conditioning element without passing through the diverter, and wherein the diverter and the reflective surfaces of the cavity are arranged to allow at least a substantial portion of the transmitted light to reach the optical conditioning element without undergoing reflection.

DESCRIPTION OF THE PREFERRED EMBODIMENTS

Figure 1:
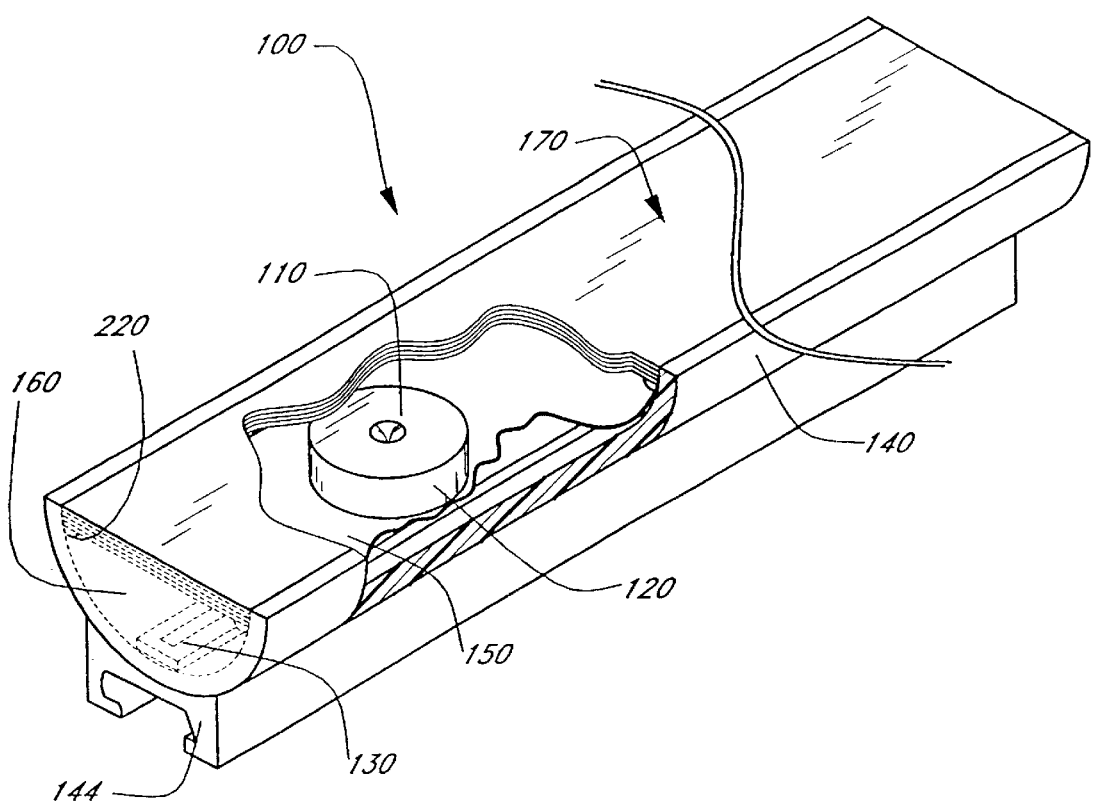
FIG. 1 shows a first embodiment of a low profile lighting device with the housing partially cut away to reveal one of the point light sources and optical diverters therein.
Figure 8:
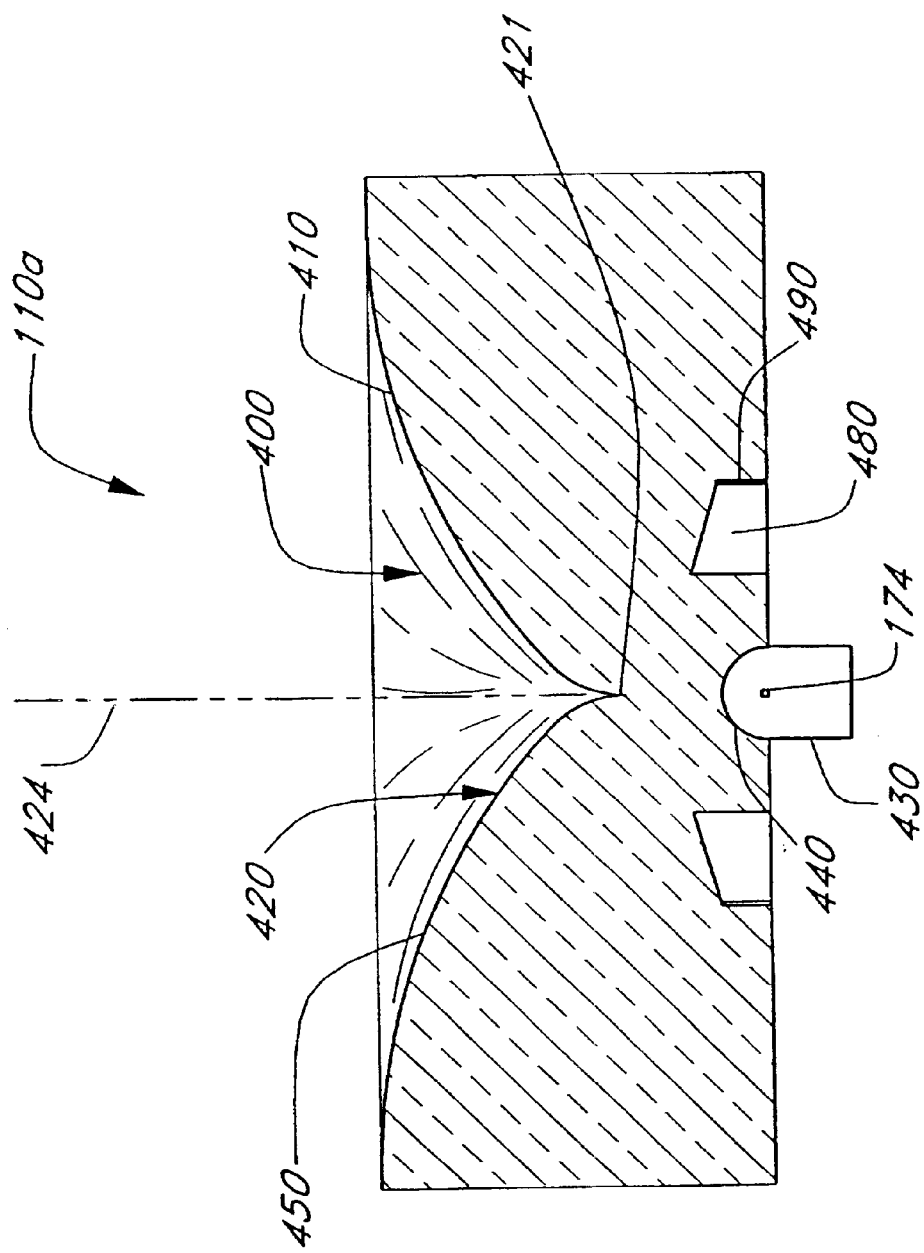
FIG. 8 shows an optical diverter which utilizes total internal reflection for laterally diverting light from a light emitting diode or other point source.

One preferred embodiment of a lighting device 100, illustrated in FIG. 1, comprises s plural light sources, each of which includes a point source such as a light emitting diode (LED) shown in FIG. 8, and an optical diverter 110. Light from the LED 174 is received by the optical diverter 110 which redirects the light laterally and downwardly. The plural LEDs are coupled to each other electrically by a printed circuit board 130 (a wire harness is an alternative configuration). The point sources 174 and optical diverters 110 are mounted within an elongate cavity formed by a sheet 150 of diffusively reflective material in the general form of a half or hemi cylinder. The sheet 150 is mounted in, and extends the length of, a housing 140, which may be an extrusion. The housing 140 is generally elongate and has a width that is not substantially greater than the width of the light output area. The printed circuit board 130 is disposed between the sheet 150 and the bottom of the housing 140. Wires (not shown) pass through the sheet 150 to electrically connect the point sources to the circuit board. A mounting channel 144 may be included on the bottom of the housing 140 for mounting the device 100 to a building. The mounting channel 144 may, for example, be made of acrylic that is bounded or glued to the housing 140, or the channel 144 may be integrally formed with the housing 140 as part of an extrusion process. The light that exits the diverters 110 is reflected by the diffusely reflecting sheet 150, located between the optical diverters 110 and the circuit board 130, as well as by diffusely reflecting end caps 160 connected to the housing 140 at either end of the device 100. If a plurality of optical diverters 110 are linearly arranged along the longitudinal axis of the cavity, the maximum separation between adjacent optical diverters 110 is preferably about twice the width of the device 100. Further, the optical diverters 110 are preferably separated by at least 0.5 inches. surfaces of the diffusely reflecting sheet 150 and the diffusely reflecting end caps 160 are preferably matte white, with diffuse reflectivity over 90%, preferably 96% or more. For this purpose, the sheet 150 and the caps 160 may be coated with diffusely reflective tape, such as DRP™ Backlight Reflector (W. L. Gore & Associates), white paint, or more exotic materials such as Labsphere Corporation's Spectraflect paint. The reflectivity of Spectraflect paint is 98%, which is considerably higher than the reflectivity of house paint, which is approximately 92%. DRP™ Backlight Reflector has a reflectivity of approximately 97%–99.5%. Alternatively, the diffusely reflecting sheet 150 and the diffusely reflecting caps 160 may be constructed from a diffusely (or specularly) reflecting material, such as titanium dioxide, pigmented Lexan™ polycarbonate, or Spectralon™ plastic, thereby avoiding the need to apply a separate coating to the sheet 150 and the end caps 160. The reflectivity of Spectralon™ plastic is about 99%. Although it is preferred that the reflective surfaces 150, 160 be diffusively reflective, in an alternative embodiment these surfaces comprise specularly reflecting surfaces that are preferably faceted as in a product sold by 3M under the name Visible Mirror Film (specular or diffuse). Additionally, while the cavity of the preferred embodiment is gas-filled (with air), the cavity may also be formed by a liquid or solid.

Figure 2:
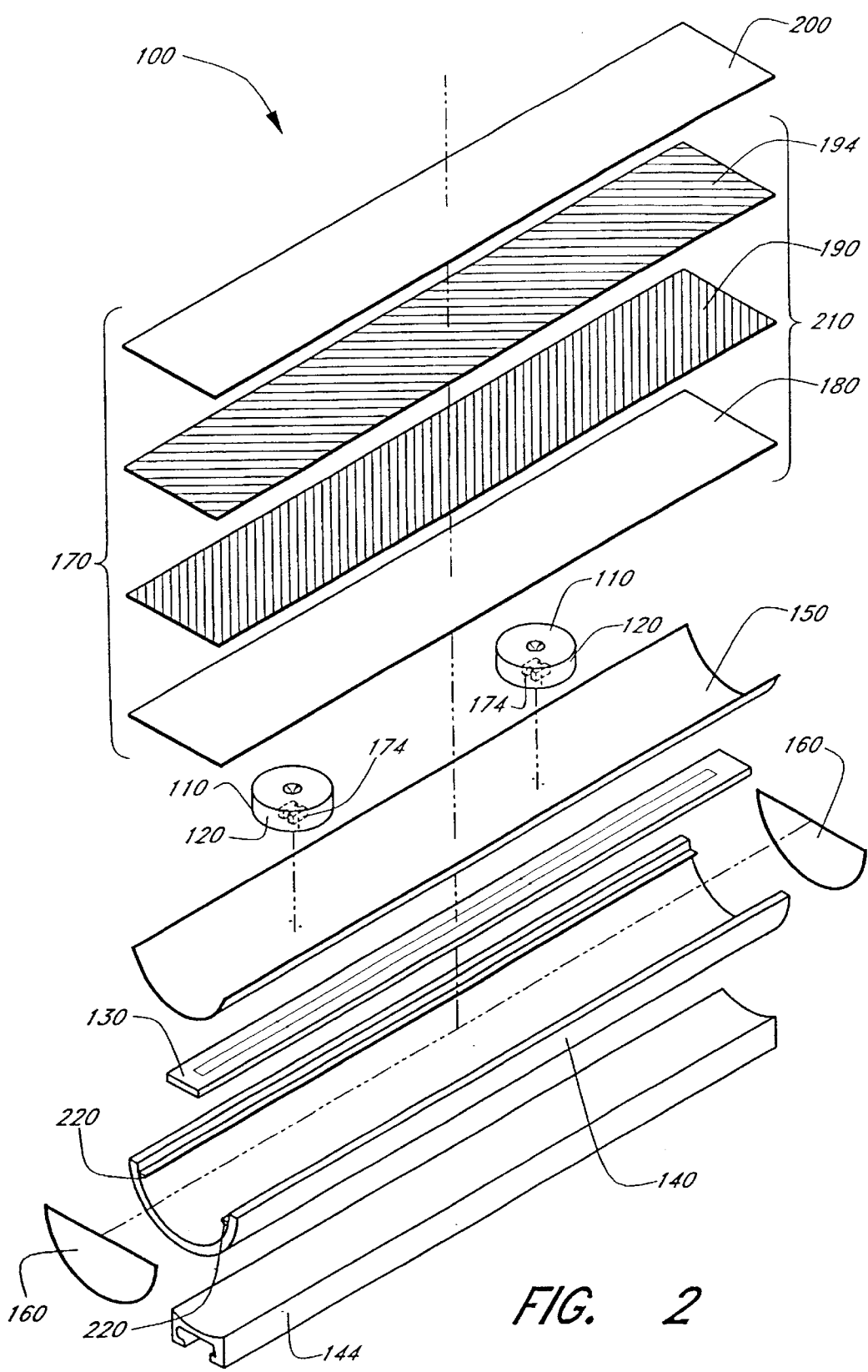
FIG. 2 is an exploded view of the embodiment illustrated in FIG. 1.

Light exits the device 100 through a sheet member or film stack 170, which faces the diffusely reflecting sheet 150. As shown in FIG. 2, the sheet member 170 acts as the output face of the device 100, and comprises an optical conditioning element 210, which may be covered with transmissive outer protective cover 200. The optical conditioning element 210 includes (in the direction of light propagating outward through the sheet member 170) one or more sheets of material, which are substantially parallel to each other, namely, a diffuser 180, an optional first prism sheet 190, and an optional second prism sheet 194. The diffuser 180 acts to randomize the direction of the light incident upon it and preferably has relatively low backscattering. By way of example, the diffuser 180 may be of any construction that will diffuse light, such as translucent sheets of plastic, or plastic with a rough surface. The prism sheets 190 and 194 may each be a brightness-enhancing film (BEF) for reducing the solid angle of the light, with an angular emission in the range of 50 to 80 degrees full width half maximum (FWHM). Brightness-enhancing films suitable for use in the preferred embodiments are commercially available from 3M Corporation. A thin film BEF, having linear pyramidal structures therein, is described in U.S. Pat. No. 5,684,354 to Gleckman, which is hereby incorporated by reference herein. Preferably, the repeated structures of the sheets 190 and 194 are crossed at generally 90 degrees with respect to each other, and are each oriented at 45 degrees with respect to the longitudinal axis of the elongate housing 140.

The diffuser 180 and the prism sheets 190 and 194 of the optical conditioning element 210 spread the light uniformly over the output face of the device 100. The prism sheets also serve to concentrate the optical energy within a field of view, and this causes the light to be directed more intensely in the direction of an observer within that field. While it is preferred that the diffuser 180 be placed below the prism sheets 190 and 194 (as shown in FIG. 2), it will be understood that the position of the diffuser and the prism sheets may be exchanged. The optical conditioning element 210 and the point source 174 are preferably separated by less than 3.5 inches, more preferably by less than 2.5 inches, and still more preferably by less than 1.5 inches. The protective outer cover 200 protects the device 100 from the environment, and may act as a color filter or contain darkened or lightened regions of a specific pattern, such as a logo, design, or alphanumeric characters.

As shown in FIG. 2, the point sources 174, such as LEDs, are disposed just beneath the optical diverters 110. Electrical leads (not shown) from the point sources 174 are connected to the printed circuit board 130, with the sheet 150 having holes punched therein for accepting the leads of the LEDs 174, such that the sheet is positioned between the LEDs and the printed circuit board. The housing 140 includes lips or flanges 220 for holding the diffusely reflecting sheet 150 in place. The sheet 150 (and the LEDs 174 and the printed circuit board 130 to which the sheet 150 is attached) is advantageously flexible so that it may be slid underneath the lips 220, permitting the sheet 150 to naturally assume a shape which is typically parabolic in cross section. When the sheet 150 assumes a parabolic cross section, light reflected off the sheet is efficiently directed towards the optical conditioner 210.

Figure 3:
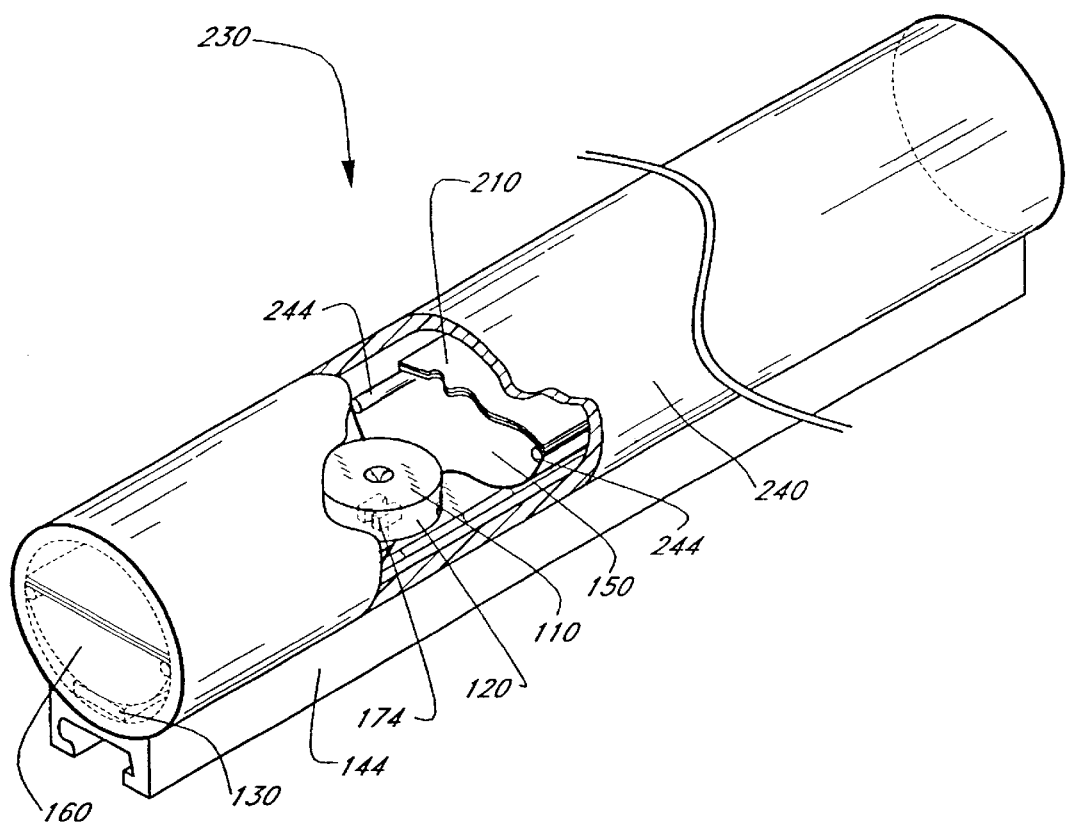
FIG. 3 shows another embodiment of a low profile lighting device.
Figure 4:
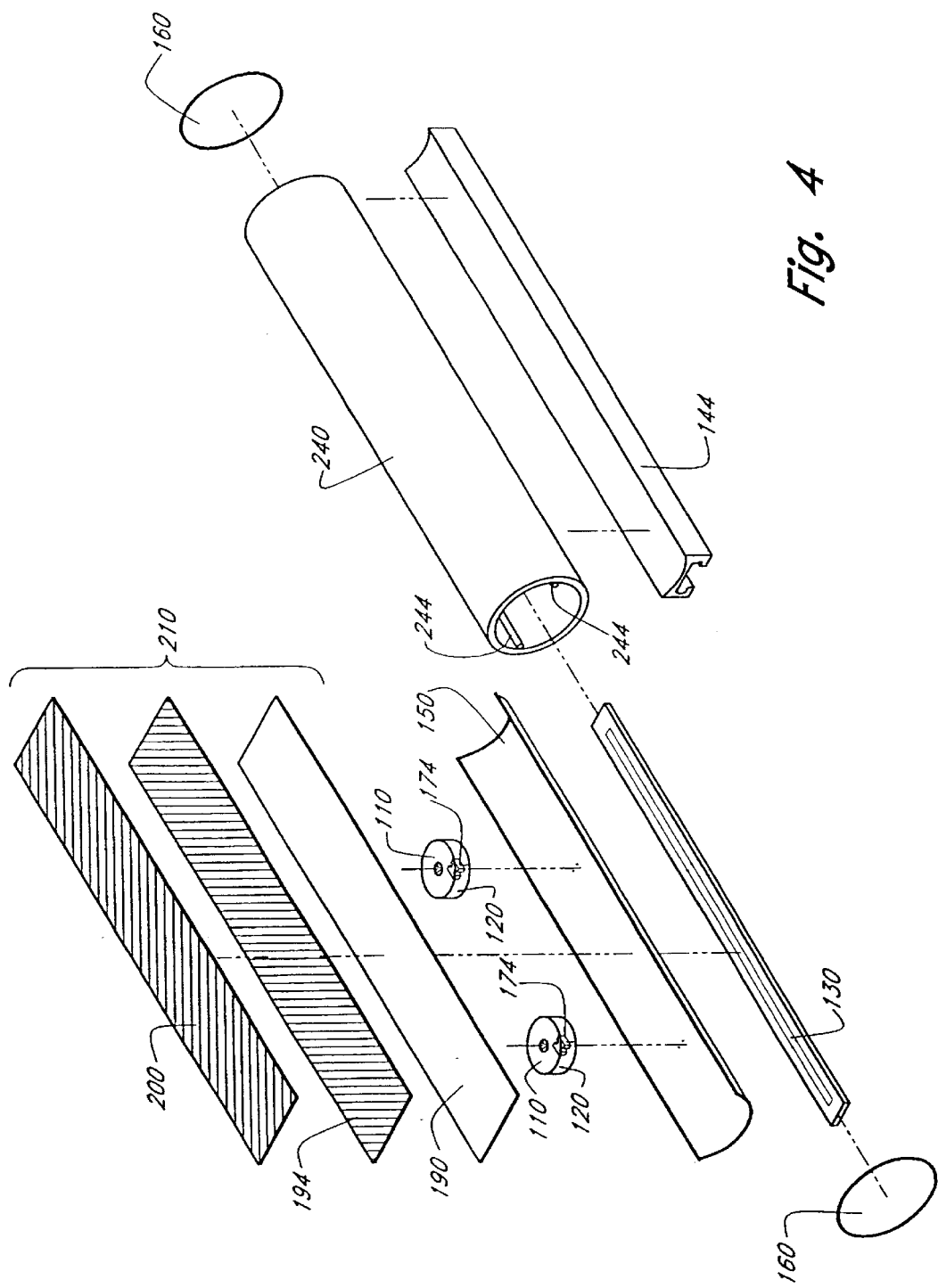
FIG. 4 is an exploded view of the embodiment illustrated in FIG. 3.

An alternative preferred embodiment is illustrated in FIGS. 3 and 4. In this embodiment, a device 230 includes a cylindrically shaped housing 240 that functions both as a housing and a protective outer cover. The sheet member 170 is secured to a pair of lips or flanges 244 that run along the length of the device 230. (The flanges 244 may also function the same as the lips 220 of FIG. 2, for holding the reflecting sheet 150 in place.) The device 230 is otherwise substantially similar to its counterpart 100 of FIGS. 1–2, and similar parts are designated with the same reference numerals. The housing 240 may be colored or include darkened portions for producing a desired visual effect. Alternatively, separate elements or layers of film (not shown) disposed between the conditioning element 170 and the housing 240 may be used for achieving a desired optical effect. Such elements may also be used in conjunction with the embodiment shown in FIGS. 1 and 2.

One aspect of the embodiments shown in FIGS. 1–2 and FIGS. 3–4 is that the intensity of light exiting the optical conditioning element 210 is spatially very uniform and thus appears to an observer to have constant luminance across the entire element 210. This uniformity can be quantified with reference to an imaginary grid of 1 mm² "pixels" on the output side of the optical conditioning element 210. As used herein, the term "pixel" means any square millimeter cell defined by an imaginary grid on the output side of the element 210 formed by two orthogonal sets of parallel lines separated by 1 mm. Thus, a pixel as used herein does not represent a discrete element, but rather corresponds to a square millimeter of the exterior surface of element 210. The ratio of the luminance of adjacent pixels is preferably between 0.95 and 1.05, more preferably between 0.98 and 1.02, and still more preferably between 0.99 and 1.01. The ratio of the luminance of non-adjacent pixels is preferably between 0.5 and 2.0, more preferably between 0.57 and 1.75, still more preferably between 0.67 and 1.5, and most preferably between 0.77 and 1.3. It will be understood that a given ratio can be more or less than 1.0, depending upon whether the ratio is determined with the intensity of the more intense pixel placed in the numerator or the denominator, respectively.

Figure 5A:
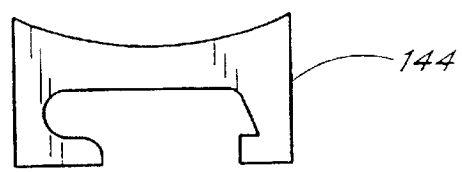
FIGS. 5A and 5B are end and plan views, respectively, of a mounting channel having a slot for mounting the embodiment of FIGS. 1–2 or FIGS. 3–4 to the mounting bracket of FIGS. 6A and 6B.
Figure 5B:
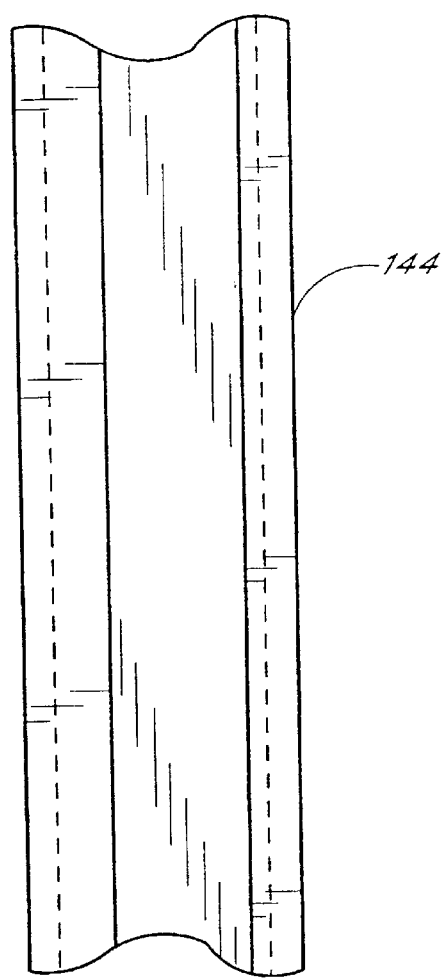
Figure 6A:
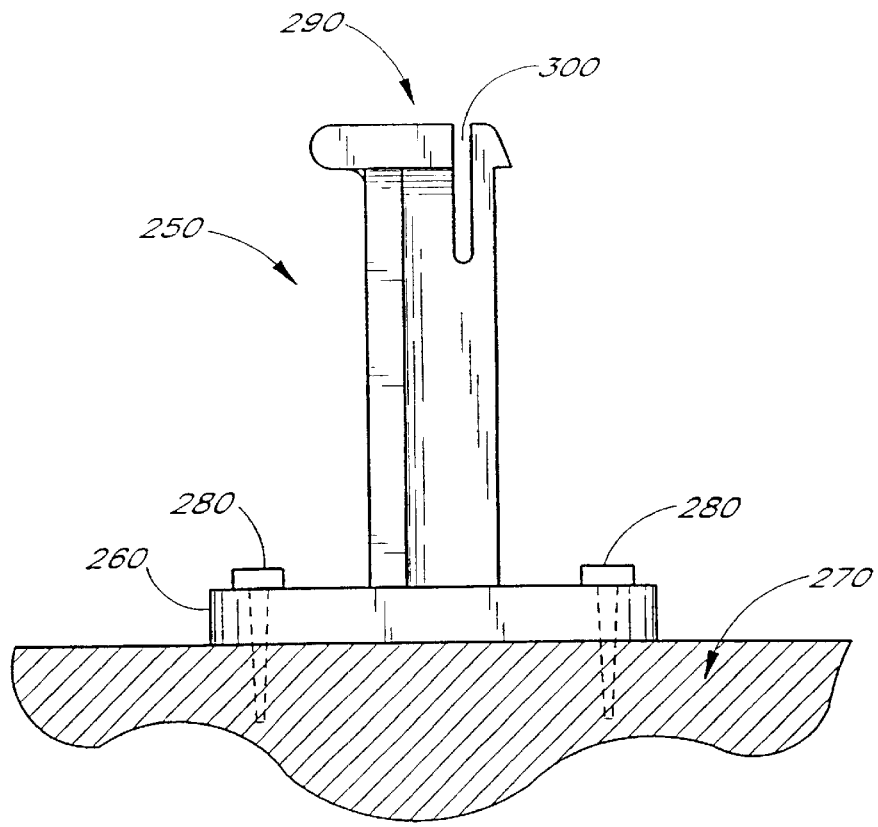
FIGS. 6A and 6B are elevation and plan views, respectively, of a mounting bracket which is secured to a mechanical structure such as a building, and which receives the mounting channel of FIGS. 5A and 5B to mount the low profile lighting device on the building.
Figure 6B:
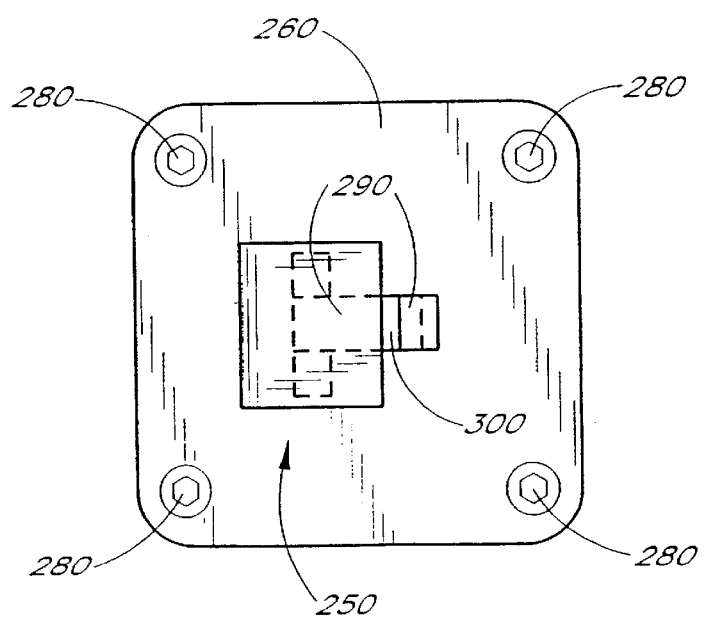

As illustrated in FIGS. 5A and 5B, the mounting channel 144 is configured to mate with a mounting bracket 250, such as that illustrated in FIGS. 6A and 6B. The mounting bracket 250 is attached to a plate 260 that may be fastened to a building 270 or other structure using screws 280, bolts or the like. The mounting bracket 250 may be made of compliant plastic (or another suitable, outdoor-rated material) and comprises a latching member 290. To secure the mounting bracket 250 to the mounting channel 144, the profile of the latching member 290 is reduced by pressing the latching member 290 into the mounting channel 144, thereby squeezing both sides of the latching member about a slot 300, so that the latching member 290 is received by the mounting channel 144. Once the latching member 290 is within the channel 144, it springs back to reassume its uncompressed state (FIG. 6A), thereby holding the lighting device 100 (230) in place.

Figure 7A:
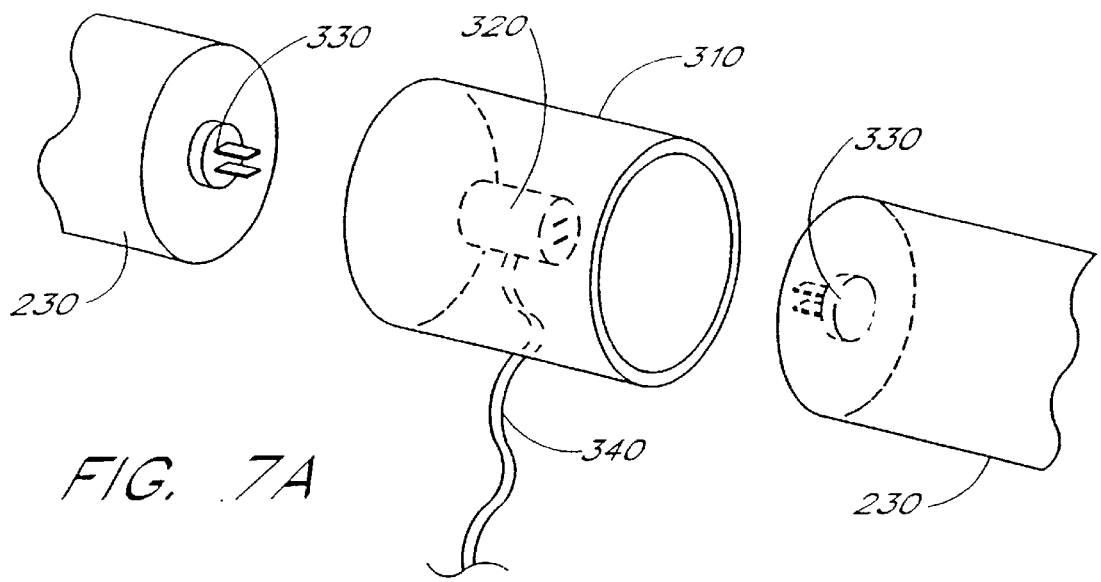
FIGS. 7A and 7B show a collar for mechanically and electrically coupling two lighting devices.
Figure 7B:
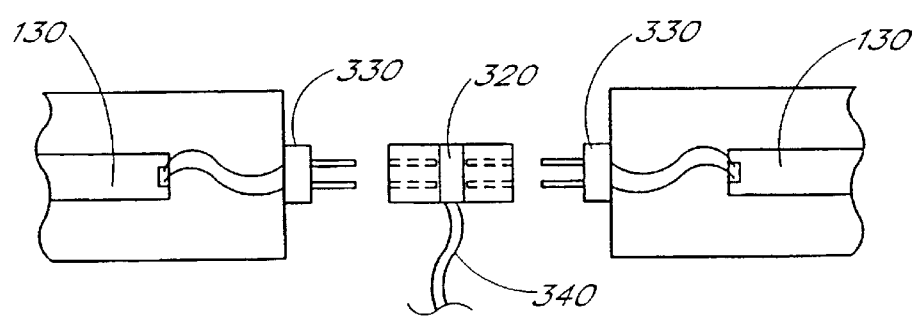
Figure 7C:
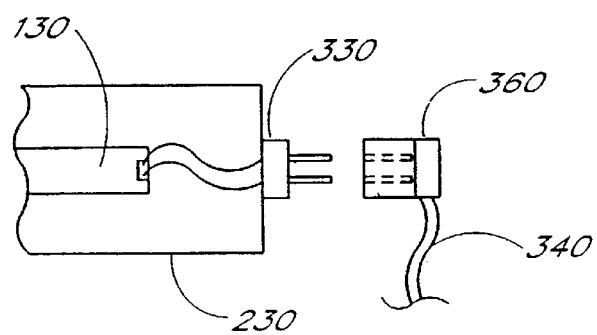
FIG. 7C shows an electrical arrangement for coupling power to an end of a lighting device.

The lighting devices 230 (100) may be advantageously constructed in segments of various lengths, such as 2, 4, or 8 feet. Two or more segments may be coupled together by a collar 310 as illustrated in FIGS. 7A and 7B. Within the collar 310 is a dual female connector 320 for receiving respective male connectors 330 from each of two lighting devices 230. The male connectors 330 are electrically connected to the printed circuit board 130, and the female connector 320 is tied electrically to a power source via an electrical line 340. The female connector 320 may be held in place within the collar 310 by, for example, rings or spokes (not shown) that extend within the collar. FIG. 7C shows an alternative arrangement in which power is supplied via a single female connector 360 located at one end of one of the devices 230. In this case, adjacent devices 230 may be connected by a dual female connector (not shown) to which no electrical line 340 is attached.

A preferred embodiment of the optical diverter 110 is illustrated with respect to FIGS. 8–11. FIG. 8 shows a cross section of an optical diverter 110a which includes a total internal reflection (TIR) region 400 with a surface 410 that is smoothly curved and defines a vortex shape forming an apex 421 that extends into the optical diverter 110a. The optical diverter 110a is surrounded by air, so that a refractive index interface is formed, which permits total internal reflection. The surface 410 of this embodiment substantially completely reflects light incident thereon, such that substantially no light is transmitted therethrough. The TIR region 400 may advantageously have the shape of an equiangular spiral that forms a cuspate portion 420. The surface 410 of FIG. 8 is shown as being axially and circularly symmetrical and extending 360 degrees about a vertical axis 424 aligned with and passing through the point source 174. However, a TIR diverter (not shown) may be used in which the cuspate portion is symmetrical about a line rather than being symmetrically oriented about a point, as in FIG. 8. Such a TIR diverter enjoys planar rather than radial symmetry.

In the embodiment of FIG. 8, the point source 174, such as an LED, is mounted below the apex 421 of the TIR surface (i.e., just below the point on the cusp 420) in close proximity thereto, with the reflecting surface extending 360° about the LED and apex. The LED 174 is contained within an LED package 430, which resides within a recess 440 in the optical diverter 110a. In order to ensure good coupling into the optical diverters 110 disclosed herein, and to reduce reflections at the interface between the LED package 430 and the boundary of the recess 440, a transparent optical coupling agent (not shown), such as an adhesive or gel, may be used to preclude any optically interfering air gaps between the LED 174 and the optical diverter. The transparent optical coupling agent could be an epoxy, silicone, or any well-known organic or inorganic optical coupling material. Preferably, the refractive index of the coupling agent is between that of the LED package and the optical diverter 110.

The surface 410 may be curved, or it may include a plurality of flat surfaces approximating a curve to form a totally internally reflecting (TIR) lens having a focal point. When the point source 174 is positioned (as shown) at this focal point, light generated by the point source 174 is totally internally reflected from the surface 410. If the surface 410 is curved, any one of a number of shapes may be employed, such as a hyperboloid, paraboloid, cone, cusp or other surface of revolution. Mathematical modeling of these shapes can be performed with an optical analysis software package such as ASAP by Breault Research of Tucson, Arizona. The surface 410 is contoured such that substantially all light rays emitted from the LED 174 at the focal point of surface 410 are incident on the surface 410 at an angle at least equal to the critical angle. This may be accomplished by calculating the range of possible incidence angles of light rays from the LED 174 at the focal point at various local portions of the surface 410. The local portions are then oriented so that all rays are incident within the critical range. The local portions could be large in size so that the surface 410 consists of a collection of flat surfaces, for example. As the size of the local portion decreases, the surface 410 forms into a smoothly curved surface having, for example, the equiangular spiral shape shown in FIG. 8.

While a circularly and axially symmetric cuspated surface is preferred for many applications, the surface 410 need not be symmetrical. In general, the surface 410 is flared so that light that reflects off of the surface 410 will be directed out of and away from the optical diverter 110*a*. In this sense, the optical diverter 110*a* of this embodiment acts as a lateral diverter of light. This flared surface 410 may be viewed as extending between an apex portion of the surface 410 (corresponding to the cusp 420 of FIG. 8) and a base portion 450 above the apex. The base portion 450 flares outwardly (radially) from the vertical axis 424 that passes through the apex 421 and the point source 174. Thus, the flared reflecting surface 410 flares outwardly from the apex 421 to the base portion 450. A groove 480 in the embodiment of FIG. 8 (and the embodiments of FIGS. 9, 10, 11 and 13 discussed below) has a depth such that substantially all rays which would otherwise propagate directly from the point source 174 to the side surface 120 of the diverter 110*a* are intercepted by at least one wall of the groove. Thus, the groove 480 prevents direct propagation of rays though the side surface 120 and onto the optical conditioning element 210, and thereby prevents such rays from causing non-uniformities in the output luminance.

Figure 9:
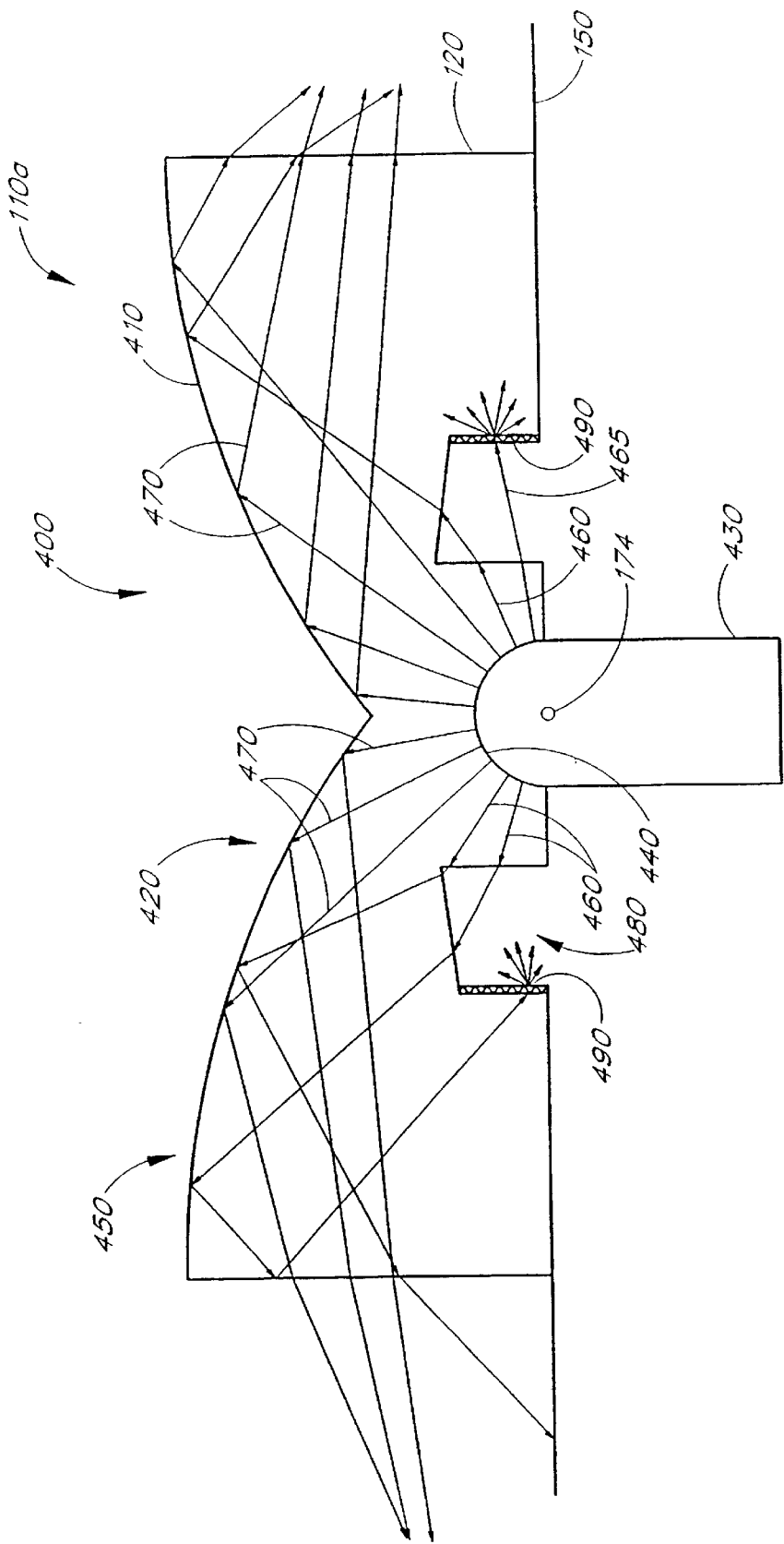
FIGS. 9, 10, and 11 show the progression of light rays through the optical diverter of FIG. 8.
Figure 10:
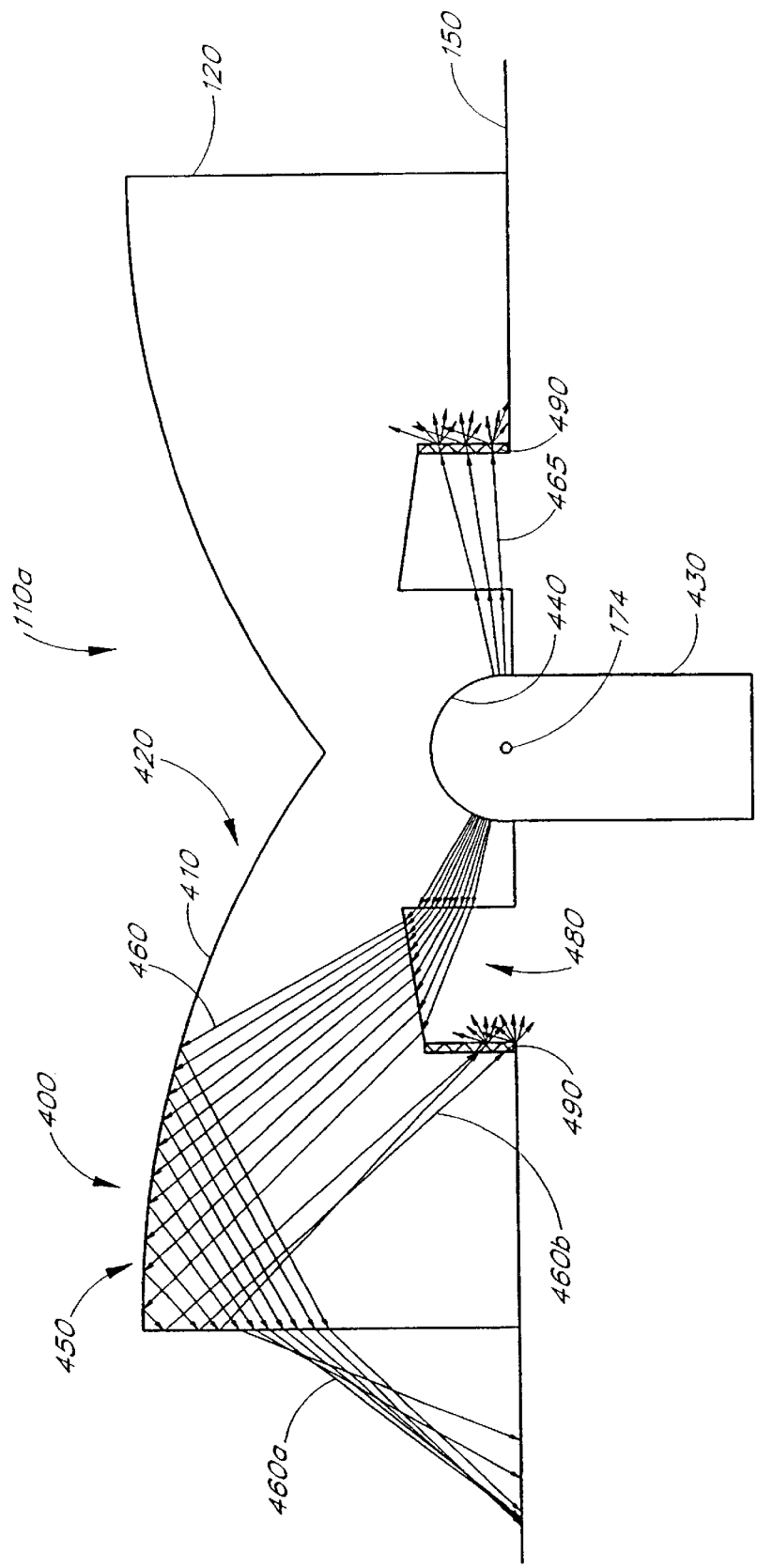
Figure 11:
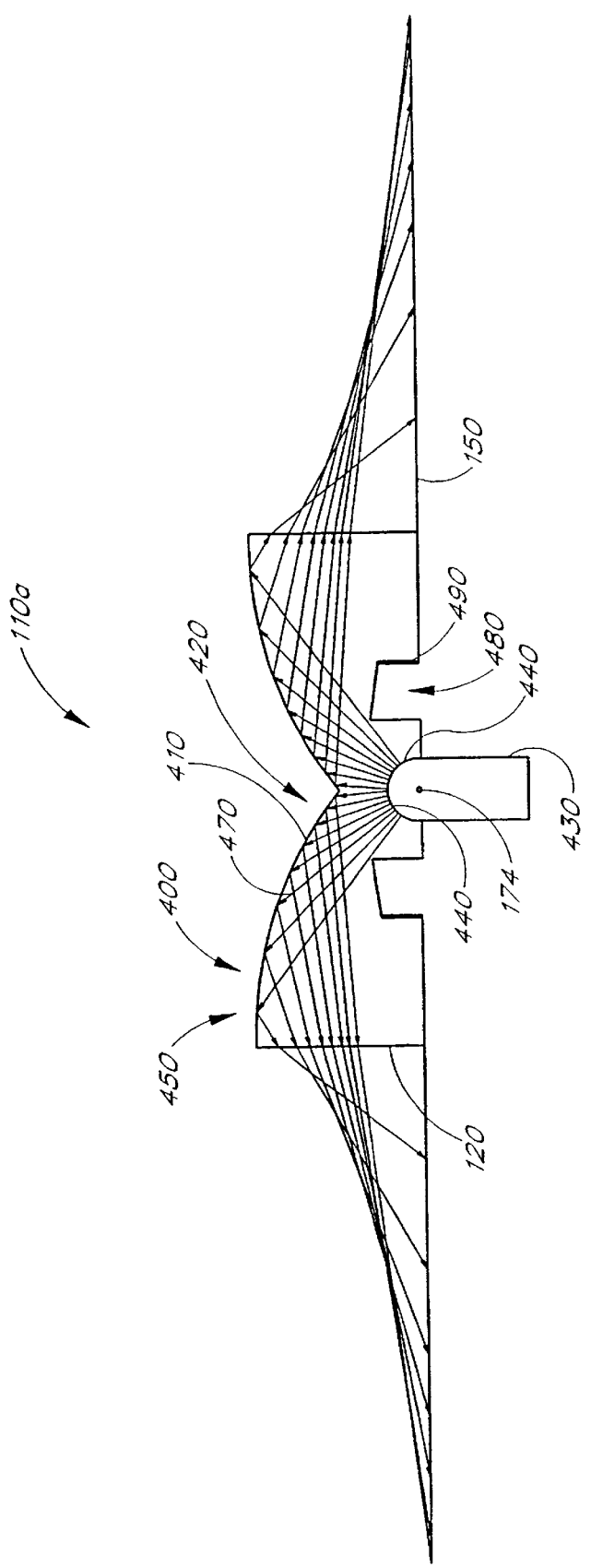

FIGS. 9–11 depict the optical paths of various rays within the optical diverter 110*a*, in which FIG. 9 is an overview of the various paths that light rays take. The optical diverter 110*a* is illustrated as having an annular groove 480, one face of which (surface 490) is frosted. The groove 480 redirects light from the LED 174 that is incident thereon. Light rays emanate from the LED 174 at the focal point of surface 410 within the LED package 430. Some light rays 460 are refracted through the inner side surface of the grove 480 for propagation to the top surface of the groove, where the rays 460 are again refracted for propagation to the TIR reflecting surface 410. Other rays 470 pass within the region bounded by the inner side surfaces of the groove 480, and thus by-pass the groove for direct propagation to the TIR reflecting surface. Rays 460 and 470 both undergo TIR at surface 410, are reflected downwards, and eventually exit the diverter through side surface 120. As discussed above in connection with FIG. 1, light exiting the diverter 110*a* is diffusely reflected by the sheet 150 and by the end caps 160 at either end of the device 100 (230), and eventually exits the device through the sheet member 170, which faces the diffusely reflecting sheet 150.

The progress of light rays 460 and 470 though the diverter 110*a* is shown in more detail in FIGS. 10 and 11, respectively. FIG. 10 shows light rays 460 being refracted by the walls of the groove 480. While some rays 460*a* pass directly out of the side surface 120 of the diverter 110*a* after undergoing TIR, other rays 460*b* are internally reflected towards the frosted surface 490, where they are scattered in many directions before exiting the device 100 (230). FIG. 10 also shows rays 465, which pass through the inner side surface of the groove 480 for propagation to the frosted outer side surface 490, where the rays 465 are scattered in many directions. This scattering prevents them from becoming visible through the output area. FIG. 11 shows light rays 470 undergoing TIR at surface 410 and being refracted at face 120, whereupon the rays 470 exit the diverter 110*a*. Surface 410 can have a shape tailored to cause uniform illumination of the sheet 150.

Figure 12:
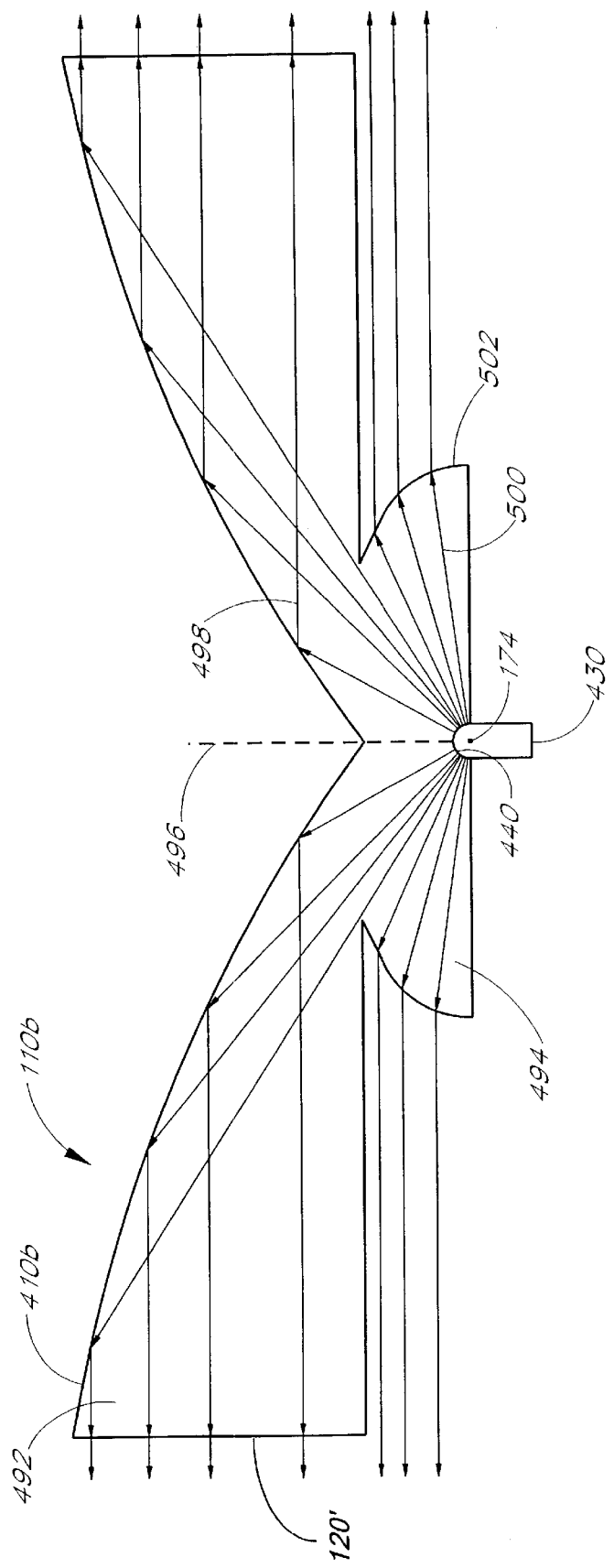
FIG. 12 shows an optical diverter which produces highly collimated "equatorial" output beam.

Another TIR embodiment is illustrated in FIG. 12, in which an optical diverter 110*b* includes a flared reflecting surface formed by a cuspate portion 492 and a refracting portion formed by an elliptical drum lens or torus portion 494, below the cuspate portion 492. Both the cuspate portion 492 and the refracting portion 494 are surfaces of revolution about an axis 496 that passes through the point source, 174, as well as through the apex of the cuspate portion 492. Light rays 498 that strike surface 410*b* in the cuspate portion 492 undergo total internal reflection and exit the diverter 110*b* propagating nominally perpendicular to the axis 496. Light rays 500 exiting a surface 502 of the toroidal portion 494 are refracted so that they also propagate nominally perpendicular to the axis 496. Further, the surface 502 is designed so that substantially no rays propagate from the point source 174 through the side surface 120' without first undergoing TIR at surface 410*b*. The resultant distribution of light outside of the diverter 110*b* is such that the embodiment of FIG. 12 acts with an isotropic hemispheric source to produce an equatorial distribution with a latitudinal beam width depending on the relative size of the point source 174. The diverter 110*b* is suitable for use in the lighting devices disclosed herein, but alternatively, it may be used by itself outside of a housing 140 (240) to produce 360 degree, latitudinally narrow output in the far field. Typical applications are aircraft warning beacons for high structures and marine beacon on buoys.

Figure 13:
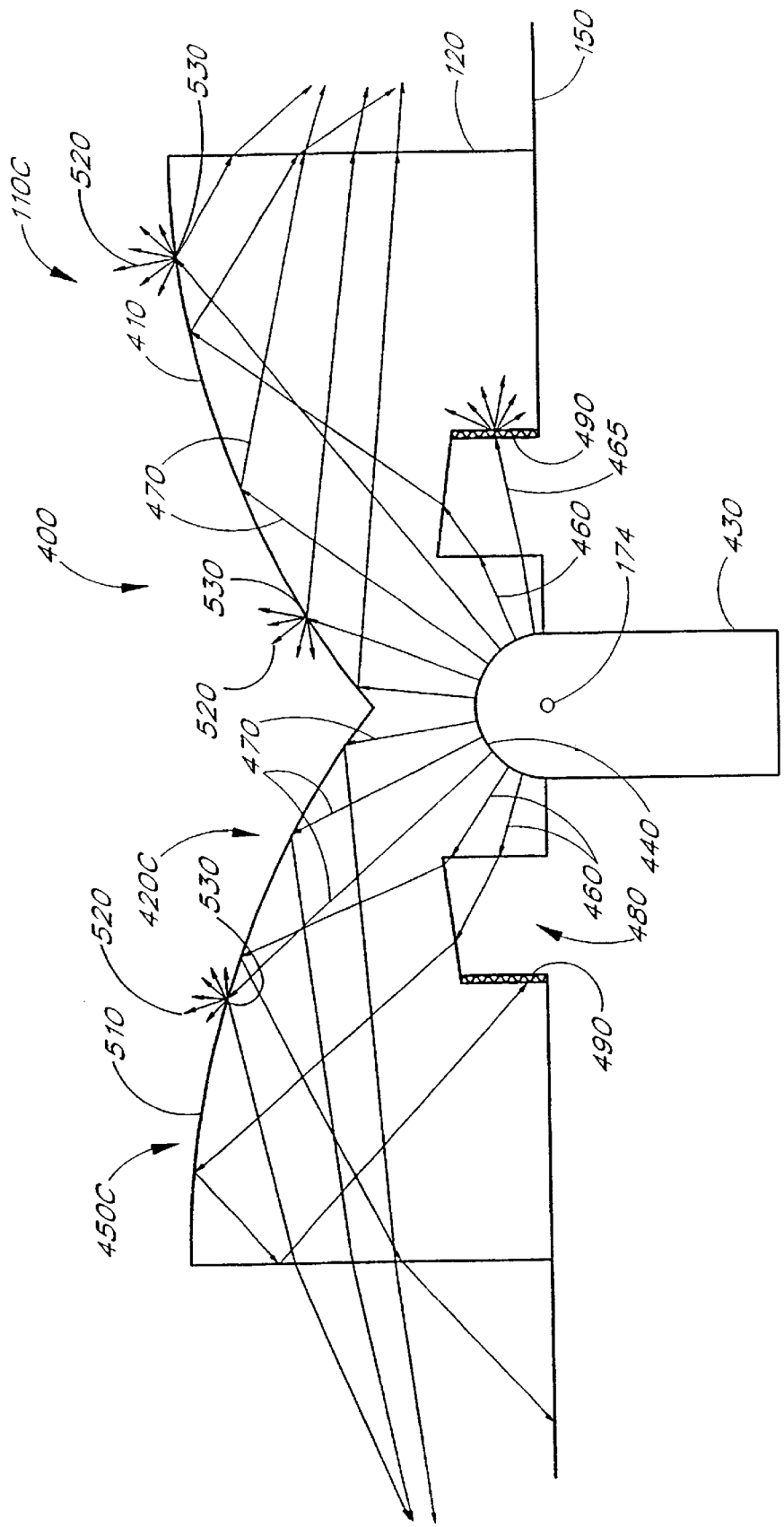
FIG. 13 shows the progression of light rays through an optical diverter having scattering centers on its top surface for diffusely transmitting some light through the top surface.

Although the embodiment illustrated in FIGS. 8–11 includes a surface 410 that is totally internally reflecting with respect to light rays 460 and 470, and the embodiment of FIG. 12 also includes a surface 410*b* hat is totally internally reflecting, an alternate embodiment comprises a surface 510 which is only partially rather than totally internally reflecting. As illustrated in FIG. 13, this embodiment includes a flared surface comprising a cuspate portion 420*c* and a base portion 450*c*. Optical radiation 520 that would otherwise be reflected for propagation through the side face 120 of the optical diverter 110*c* passes through (i.e., is diffusely transmitted by) the surface 510 for propagation directly through the sheet member 170, without reflecting off the reflective sheet 150 or one of the caps 160. This may enhance uniformity of illumination of the sheet member 170 and eliminate optical losses associated with reflections off the sheet 150 and the caps 160. In FIG. 13, however, a substantial portion of the light rays 460 and 470 are preferably still totally internally reflected at surface 510. The optical diverter 110c may be advantageously sized to allow at least a substantial portion of the light reflected off the cavity sheet 150 to reach the optical conditioning element 210 without passing through the diverter 110c, and the reflective surfaces 150 and 160 arranged to allow at least a substantial portion of the light transmitted through the surface 510 to reach the optical conditioning element without reflection. This feature acts to compensate for reduced illumination of the sheet 150 just beneath the diverter 110c.

Figure 14:
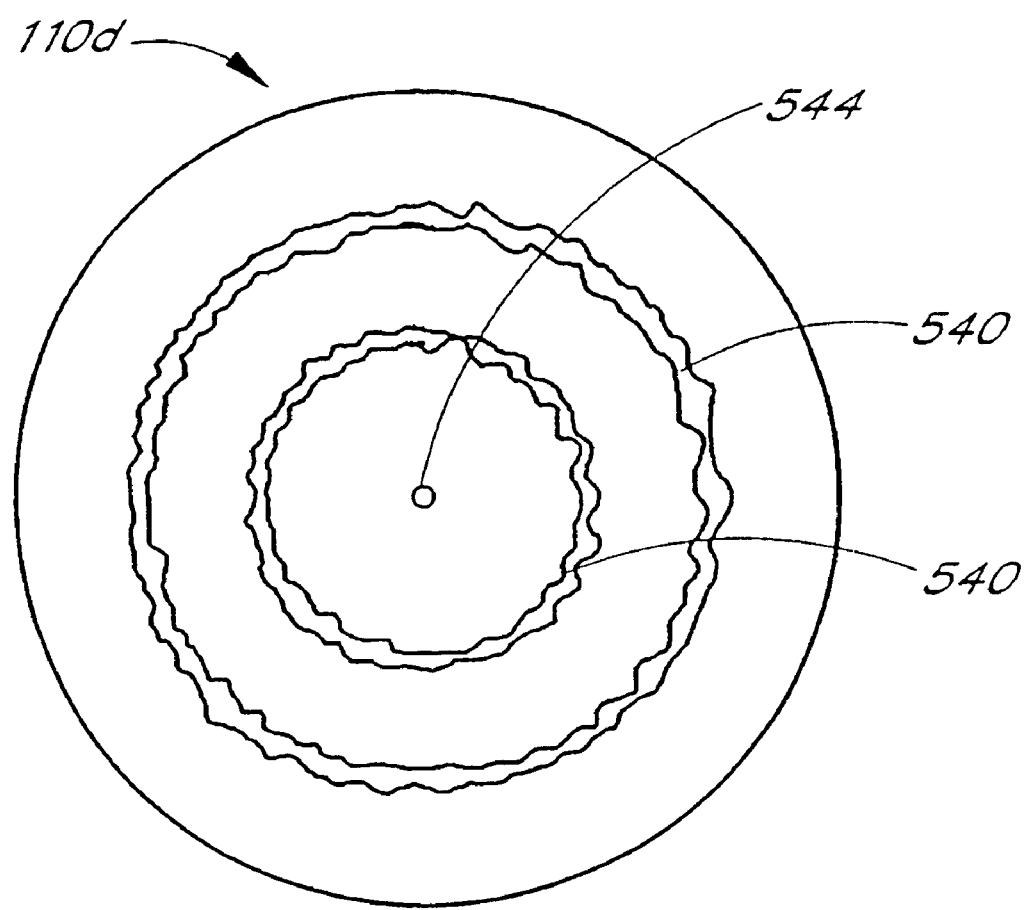
FIG. 14 shows an optical diverter having a roughened surface pattern in the form of a series concentric rings on its top surface for diffusely transmitting some light through the top surface.

A surface 510 that is partially reflecting and partially transmitting may, in general, be formed by appropriately selecting the angle of incidence between the light rays 460 (470) and the surface 190. For example, the surface 510 may be formed at an angle that insures that some light "leaks through" the surface 190 while other light is reflected off of surface 190. Additionally, the apex of the cuspated portion may be rounded to provide controlled leakage of light from the LED 174 through the surface 510 immediately above the LED. This eliminates dark spots above the LED 174. Moreover, as illustrated in FIG. 13, a surface 410 that is initially totally internally reflecting may be lightly sandblasted or etched to form distributed scattering centers 530 thereon, such that some of the light incident on the scattering centers passes through the surface 410. These scattering centers 530 may be distributed non-uniformly on the surface 410. Also, the surface 410 may be heavily etched or sandblasted to form a pattern such as a series of concentric rings 540 (see the diverter 110d of FIG. 14) about a center 544 at an apex of the surface, which likewise results in some of the light leaking through the surface.

The optical diverters shown in FIGS. 8–14 may be comprised of material that is transparent to the light produced by the LED 174, such as a transparent polymeric material, and may be manufactured by various well-known methods, such as machining or injection molding. Preferred materials for the optical diverters 110 are acrylic, polycarbonate, and silicone. Acrylic, which has an index of refraction of approximately 1.5, is scratch-resistant and has a lower cost relative to polycarbonate. On the other hand, polycarbonate, which has an index of refraction of approximately 1.59, has higher temperature capabilities than acrylic. Polycarbonate also has improved mechanical capabilities over acrylic. Silicone has a refractive index of approximately 1.43. The refractive index of air is nearly 1.0.

While the reflectors of the preferred embodiments are flared, another embodiment (not shown) utilizes a non-flared planar reflector which is partially reflective and partially transmissive. Also, instead of using optical diverters 110 which rely upon total or partial internal reflection, reflection may be provided by partially or totally reflective mirrors (not shown), in which the mirrors are preferably contoured to reflect light laterally. Such mirrors may advantageously include a curved surface, so that light is reflected over a range of angles and scattered within the device 100 (230) to provide uniform illumination of the sheet member 170. This function may also be performed by a transparent optical element that has a non-uniform change in its index of refraction, for example, a gradient index optical element.

The point sources 174 may advantageously comprise an LED cluster that provides tricolor output, e.g., red, green, and blue, so that virtually any color may be produced by appropriately selecting the relative intensity of the respective component wavelengths. Further, both gradual and fast time-changes in color are possible, and travelling wave patterns may be generated when the respective outputs of the LEDs 174 are successively varied in a coordinated fashion. Although the point sources 174 have been principally described with respect to LEDs, other point sources may be used, such as miniature incandescent filaments or arc lamps (not shown). However, LEDs are preferred because of their ability to operate at relatively low voltage (e.g., 24 volts DC or less). Also, LEDs generate no RF interference. As a further alternative to using LEDs as the point sources 174, a fiber optic line (not shown) may be used to distribute light to a series of optical diverters 110, in which light is tapped off at various points along the fiber optic line (corresponding to the point sources 174) and is directed into the diverters. In this case, a laser diode or other light generator may be used to couple light into the fiber optic line, and the fibers form the point sources of light.

Figure 15:
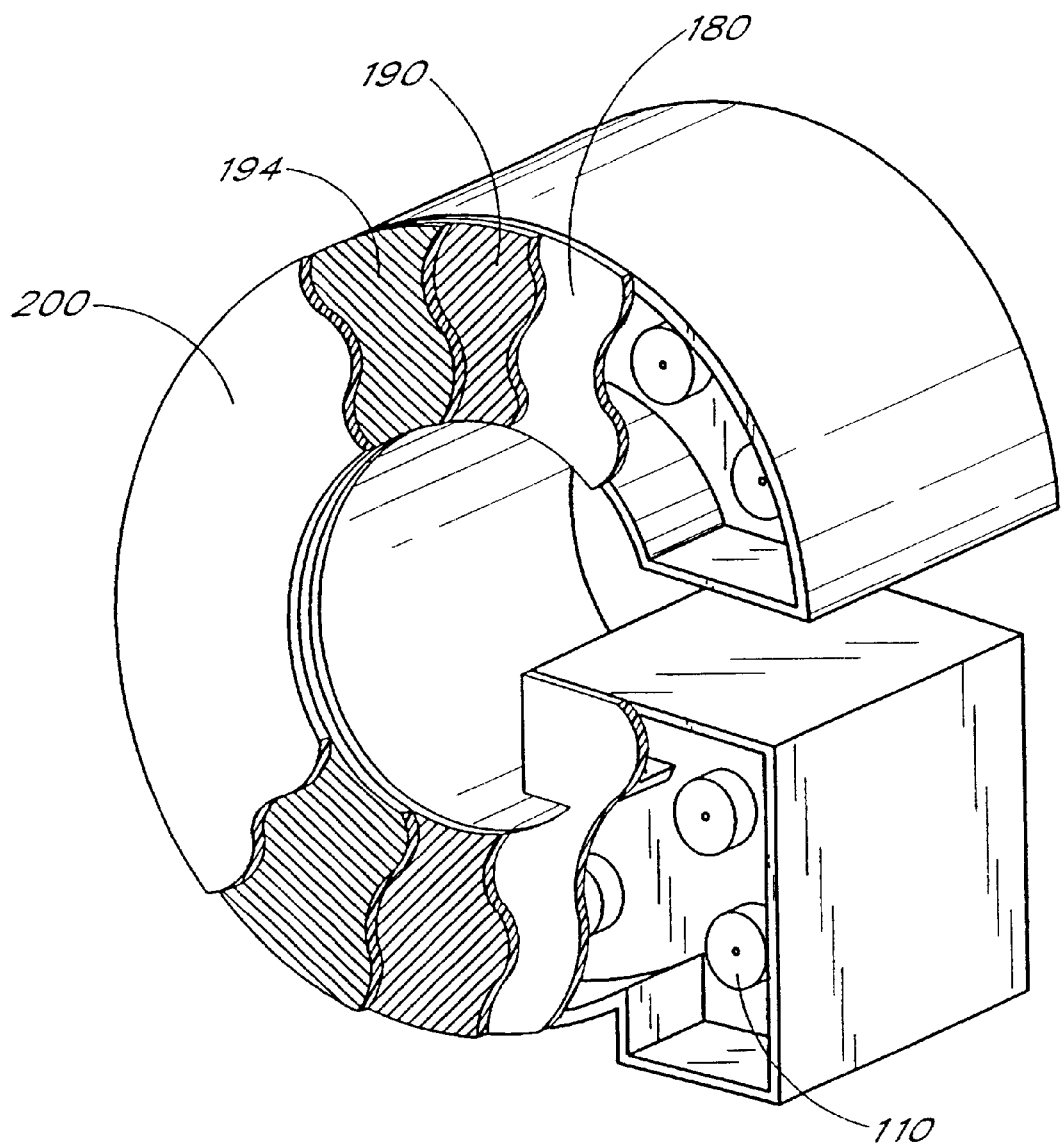
FIG. 15 shows an embodiment of a lighting device in the form of an alphanumeric character.

The cylindrical or semi-cylindrical devices illustrated in FIGS. 1–4 may be used in a number of different applications, such as for decorative illumination, light boxes, backlights, and for guidance along pathways. Further, the housing utilized with the optical diverters 110 and sheet member 170 may be constructed in various sizes and shapes, including wide area planar, linear elongate, and curved elongate. FIG. 15 illustrates one embodiment in which the letter "G" has been formed. Other possible embodiments will be apparent to those skilled in the art. For example, instead of positioning the optical diverters 110 along a line or a curve, the optical diverters may be mounted, for example, in a grid (not shown) to cover a wide-area display, the surface of which may have numbers, letters, logos, or other indicia printed thereon.

It should be understood that the scope of the present invention is not limited by the illustrations or the foregoing description thereof, and that certain variations and modifications of the foregoing embodiments will suggest themselves to one of ordinary skill in the art.

What is claimed is:

1. An illumination apparatus, comprising:
   a cavity having reflective surfaces and an output area;
   at least one light source disposed in said cavity, said light source comprising a point source and an optical diverter having a flared reflecting surface; and
   an optical conditioning element over said output area, said optical conditioning element comprising at least a diffuser.

2. The apparatus of claim 1, wherein said flared reflecting surface extends between an apex portion of said surface and a base portion of said surface, said diverter having an axis passing through the apex portion and the point source, said base portion being above the apex portion and extending radially outwardly from said axis such that the reflecting surface flares outwardly from the apex portion to the base portion.

3. The apparatus of claim 2, wherein the flared surface is curved.

4. The apparatus of claim 3, wherein the flared surface is cuspated.

5. The apparatus of claim 2, wherein the flared surface is formed by a refractive index interface configured to totally internally reflect light from the point source laterally outwardly from said axis.

6. The apparatus of claim 1, wherein the point source comprises an LED.

7. The apparatus of claim 1 wherein the point source comprises a miniature incandescent filament or arc lamp.

8. The apparatus of claim 1, wherein the optical conditioning element comprises a prism sheet.

9. The apparatus of claim 8, additionally comprising a second prism sheet, each prism sheet having repeated structures oriented generally orthogonal to repeated structures of the other prism sheet.

10. The apparatus of claim 8, wherein the prism sheet and diffuser are in substantially parallel relationship, with the diffuser closer to the light sources than the prism sheet.

11. The apparatus of claim 1, wherein said cavity is within an elongate housing having a width which is not substantially greater than the width of the output area.

12. The apparatus of claim 11, wherein the optical conditioning element comprises at least one prism sheet having repeated structures oriented at about 45° relative to a longitudinal axis of the elongate housing.

13. The apparatus of claim 11, wherein the apparatus comprises at least two of said elongated housings coupled end to end.

14. The apparatus of claim 1, wherein the point source and the optical conditioning element are separated by 3½ inches or less.

15. The apparatus of claim 1, wherein the point source and the optical conditioning element are separated by 2½ inches or less.

16. The apparatus of claim 1, wherein the point source and the optical conditioning element are separated by 1½ inches or less.

17. The apparatus of claim 1, wherein the cavity reflecting surfaces are diffusively reflective.

18. The apparatus of claim 17, wherein the diffusively reflective surfaces have a reflectivity of at least 90%.

19. The apparatus of claim 1, wherein the flared reflecting surface is partially reflective and partially transmissive.

20. An illumination apparatus, comprising:
a housing comprising a cavity having reflective surfaces and an output aperture;
an optical conditioning element across the output aperture, said conditioning element comprising at least one sheet having a plurality of pixels;
at least one light source disposed within said cavity directly beneath said conditioning element, said at least one light source comprising a point source spaced less than 3½ inches from said sheet and illuminating said reflective surfaces such that the ratio of the luminance of adjacent pixels is between 0.95 and 1.05 and the ratio of the luminance of non-adjacent pixels is between 0.5 and 2.0, whereby the appearance of illumination at said sheet is substantially uniform.

21. The apparatus of claim 20, wherein said reflective surfaces of said cavity are diffusively reflective with a reflectivity of at least 90%.

22. The apparatus of claim 20, wherein said ratio of adjacent pixels is 0.98 to 1.02.

23. The apparatus of claim 20, wherein said ratio of adjacent pixels is 0.99 to 1.01.

24. The apparatus of claim 20, wherein said ratio of non-adjacent pixels is 0.57 to 1.75.

25. The apparatus of claim 20, wherein said ratio of non-adjacent pixels is 0.67 to 1.5.

26. The apparatus of claim 20, wherein said ratio of non-adjacent pixels is 0.77 to 1.3.

27. The apparatus of claim 20, wherein said sheet comprises a prism sheet.

28. The apparatus of claim 27, wherein the optical conditioning element comprises a diffuser sheet disposed below the prism sheet.

29. The apparatus of claim 28, wherein the optical conditioning element comprises a second prism sheet.

30. The apparatus of claim 20, wherein said at least one light source comprises a point source and a total internal reflection lens having a cuspated surface for reflecting light from the point source against said diffusive reflective surfaces.

31. The apparatus of claim 20, wherein the apparatus has plural light sources spaced by 2½ inches or less from the sheet.

32. The apparatus of claim 20, wherein the apparatus has plural light sources spaced from each other by at least one-half inch.

33. An illumination apparatus, comprising:
a cavity formed by reflective material, said cavity having an output area;
an optical conditioning element at said output area;
a light source in said cavity, said light source comprising a point source and an optical diverter having a reflecting surface that is partially reflective and partially transmissive, said reflective surface allowing a portion of light incident thereon to pass through the reflecting surface, while reflecting another portion of the incident light onto the reflective material, said reflective material reflecting light within said cavity, whereby said output area and optical conditioning element are illuminated.

34. The apparatus of claim 33, wherein said reflective material is diffusively reflective with a reflectivity of at least 90%.

35. The apparatus of claim 33, wherein said reflecting surface of said optical diverter is comprised of a refractive index interface that totally internally reflects said substantial portion of the incident light while permitting another portion of light to pass through the interface.

36. The apparatus of claim 35, wherein said reflecting surface of said optical diverter is comprised of scattering centers that scatter light incident thereon.

37. The apparatus of claim 36, wherein the scattering centers are distributed over said reflecting surface.

38. The apparatus of claim 37, wherein the distribution is non-uniform.

39. The apparatus of claim 38, wherein the scattering centers are in the form of a pattern.

40. The apparatus of claim 39, wherein the pattern comprises concentric rings having a center at a vertex of the reflective surface.

41. An illumination apparatus, comprising:
an optical diverter comprised of transparent material having a reflecting surface formed by a refractive index interface configured to totally internally reflect light from a point source positioned to emit a first portion of light rays towards the reflecting surface and a second portion of light rays towards a side surface of the diverter, said diverter comprising a refracting interface that refracts the second portion of light rays towards the reflecting surface, such that both the first and second portions of light rays are reflected from said reflecting surface.

42. The illumination device of claim 41, wherein said point source emits a third portion of light rays towards said side surface, said diverter further comprising a scattering surface that scatters said third portion of rays.

43. The illumination device of claim 41, wherein the point source is disposed at the bottom of the diverter, and the reflecting surface is oriented to reflect the first and second portions of light rays towards the bottom of the diverter.

44. An illumination apparatus, comprising:

an optical diverter comprised of transparent material having a flared reflecting surface formed by a refractive index interface, said interface configured to totally internally reflect light from a point source that is positioned adjacent to an apex of the flared reflecting surface and which emits light rays for reflection by the reflecting surface.

45. The apparatus of claim 44, wherein at least a portion of the reflecting surface is partially transmissive such that some of the light is transmitted through the surface.

46. The apparatus of claim 45, wherein said portion comprises the apex.

47. The apparatus of claim 44, wherein the reflective surface substantially completely reflects light incident thereon, such that substantially no light is transmitted therethrough.

48. The apparatus of claim 44, wherein the reflecting surface extends 360° about the apex.

49. The apparatus of claim 44, comprising a drum lens forming an integral portion of the diverter.

50. An illumination apparatus, comprising:

a cavity having reflective surfaces and an output area;

at least one light source disposed in said cavity, said light source comprising a point source and an optical diverter having a surface that is partially reflective and partially transmissive;

an optical conditioning element over said output area, said optical conditioning element comprising a diffuser, said diverter positioned between the point source and optical conditioning element such that (a) a portion of light emitted by the point source is reflected from the diverter towards the reflective surfaces of the cavity, and (b) another portion of light emitted by the point source is transmitted through the surface of the diverter towards the optical conditioning element, said diverter sized to allow at least a substantial portion of the reflected light to reach the optical conditioning element without passing through the diverter, said diverter and said reflective surfaces of said cavity arranged to allow at least a substantial portion of the transmitted light to reach the optical conditioning element without undergoing reflection.

51. The illumination apparatus of claim 50, wherein the diverter comprises a lateral diverter.

52. The illumination apparatus of claim 51, wherein the lateral diverter has a flared surface.

* * * * *

UNITED STATES PATENT AND TRADEMARK OFFICE
CERTIFICATE OF CORRECTION

PATENT NO. : 6,582,103 B1
DATED : June 24, 2003
INVENTOR(S) : Popovich et al.

It is certified that error appears in the above-identified patent and that said Letters Patent is hereby corrected as shown below:

Column 3,
Line 47, delete "s plural" and insert -- plural -- therefor.
Line 49, after "(LED)" insert -- 174 --.

Column 4,
Line 13, before "surfaces" insert -- The --. (begins new paragraph)

Column 8,
Line 36, delete "source, 174" and insert -- source 174 -- therefor.
Line 60, delete "hat" and insert -- that -- therefor.

Signed and Sealed this

Tenth Day of May, 2005

JON W. DUDAS
*Director of the United States Patent and Trademark Office*